(12) United States Patent
Park et al.

(10) Patent No.: US 12,603,907 B2
(45) Date of Patent: Apr. 14, 2026

(54) SERVER AND METHOD FOR PROVIDING ONLINE THREAT DATA BASED ON USER-CUSTOMIZED KEYWORDS FOR PRIVATE CHANNEL

(71) Applicant: S2W INC., Seongnam-si (KR)

(72) Inventors: Soo Yeon Park, Seoul (KR); Hyun Chae Yang, Yongin-si (KR); Sang Duk Suh, Seongnam-si (KR); Jae Ki Kim, Changwon-si (KR)

(73) Assignee: S2W INC., Seongnam-si (KR)

( * ) Notice: Subject to any disclaimer, the term of this patent is extended or adjusted under 35 U.S.C. 154(b) by 79 days.

(21) Appl. No.: 18/398,574

(22) Filed: Dec. 28, 2023

(65) Prior Publication Data

US 2024/0250973 A1      Jul. 25, 2024

(30) Foreign Application Priority Data

Dec. 30, 2022    (KR) ......................... 10-2022-0190122

(51) Int. Cl.
*H04L 9/40* (2022.01)
*G06F 16/9535* (2019.01)

(52) U.S. Cl.
CPC ................................ *H04L 63/1425* (2013.01)

(58) Field of Classification Search
CPC ............. H04L 63/1425; H04L 63/1416; H04L 63/306; H04W 12/12
See application file for complete search history.

(56) References Cited

U.S. PATENT DOCUMENTS 9,223,971 B1 * 12/2015 Bartolomie ........... H04L 51/212
9,584,393 B2 * 2/2017 Kjendal .............. H04L 67/1095
(Continued)

FOREIGN PATENT DOCUMENTS

CN 107590214 A1 1/2018
CN 112732919 A1 4/2021
KR 10-2021-0083936 A1 7/2021

OTHER PUBLICATIONS

Srividya et al., "Behavioral analysis of internet messaging and malicious activity detection," 2016 International Conference on Advances in Human Machine Interaction (HMI) Year: 2016 | Conference Paper | Publisher: IEEE.*

(Continued)

*Primary Examiner* — Roderick Tolentino
(74) *Attorney, Agent, or Firm* — USX IP LLC

(57) ABSTRACT

According to an embodiment of the present disclosure, a server for providing online threat data based on user-customized keywords includes: an online threat data collection unit that accesses a channel of a messenger program and collects channel-specific online threat data; an online threat database construction unit that analyzes the online threat data to extract a string, uses the string as an index to generate information for retrieving the online threat data, and stores the generated information in a channel-specific database; when the user-customized keywords and user identifiers are received from a user terminal through a user-customized keyword registration procedure, a user-customized keyword database construction unit that matches the user-customized keywords with the user identifiers and stores the matched user-customized keywords and user identifiers in a user-customized keyword database; and when the user terminal logs in using the user identifiers, an online threat data providing unit that extracts a pre-registered user-customized keyword corresponding to the user identifier from the user-customized keyword database, extracts the channel-specific online threat data corresponding to the user-customized keywords from the channel-specific database, and provides the extracted online threat data to the user terminal.

6 Claims, 5 Drawing Sheets

(56) References Cited

U.S. PATENT DOCUMENTS

| | | | |
|---|---|---|---|
| 11,184,378 B2 * | 11/2021 | Meshi | H04L 63/1441 |
| 11,363,037 B2 * | 6/2022 | Karin | H04L 63/1416 |
| 2016/0188702 A1 * | 6/2016 | Lee-Goldman | G06F 16/3322 |
| | | | 707/749 |
| 2020/0195694 A1 * | 6/2020 | Kalinin | G06Q 10/107 |
| 2022/0180395 A1 * | 6/2022 | Kudlacz | G06F 16/90335 |
| 2022/0239684 A1 * | 7/2022 | Koide | H04L 63/1425 |
| 2023/0291766 A1 * | 9/2023 | Turgeman | H04L 63/1433 |
| 2024/0056477 A1 * | 2/2024 | Rangwala | G06N 20/00 |

OTHER PUBLICATIONS

Beck, Kristofer, "Analyzing tweets to identify malicious messages,"
2011 IEEE International Conference on Electro/Information Tech-
nology Year: 2011 | Conference Paper | Publisher: IEEE.*
Communication dated Dec. 1, 2025 in Korean Application No.
10-2022-0190122.

* cited by examiner

START

S310

ACCESS CHANNEL OF MESSENGER PROGRAM
TO COLLECT CHANNEL-SPECIFIC ONLINE THREAT DATA

S320

ANALYZE ONLINE THREAT DATA TO EXTRACT STRING

S330

USE STRING AS INDEX
TO GENERATE INFORMATION RETRIEVING ONLINE THREAT STRING
AND/OR ONLINE THREAT DATA
AND STORE GENERATED INFORMATION IN DATABASE

END

START

DETECT LOG IN OF USER TERMINAL                                    S510

EXTRACT
PRE-REGISTERED USER-CUSTOMIZED KEYWORD CORRESPONDING TO
USER IDENTIFIER FROM USER-CUSTOMIZED KEYWORD DATABASE            S520

EXTRACT ONLINE THREAT DATA CORRESPONDING TO
USER-CUSTOMIZED KEYWORD FROM CHANNEL-SPECIFIC DATABASE           S530

PROVIDE ONLINE THREAT DATA CORRESPONDING TO
USER-CUSTOMIZED KEYWORD                                          S540

END

SERVER AND METHOD FOR PROVIDING ONLINE THREAT DATA BASED ON USER-CUSTOMIZED KEYWORDS FOR PRIVATE CHANNEL

CROSS-REFERENCE TO RELATED APPLICATION

This application claims priority to and the benefit of Korean Patent Application No. 2022-0190122, filed on Dec. 30, 2022, the disclosure of which is incorporated herein by reference in its entirety.

BACKGROUND

1. Field of the Invention

The present disclosure relates to a server and method for providing online threat data for a private channel. More particularly, the present disclosure relates to a server and method for collecting data related to threat information from a message-based online service channel and then supporting retrieval for arbitrary threat information.

2. Discussion of Related Art

KakaoTalk's open chat, Telegram channels, and the like may accommodate a large number of people due to the nature of mobile messengers and thus are often used for information sharing and promotion, and the like.

In the case of the Telegram channels, there are cases where sensitive information, threat information, or the like is shared and/or sold through public or private chat rooms. However, the channels for sharing and/or selling such threat information are not easily visible, so there is a problem in that it is difficult for general users to find and participate in the corresponding channel directly.

In addition, in the case of general messengers, only message searching based on search terms is supported, so there is a problem in that it is difficult to find messages that satisfy complex conditions.

SUMMARY OF THE INVENTION

The present disclosure is directed to providing a server and method for providing online threat data based on user-customized keywords, which are capable of collecting online threat data posted on a message-based public channel and private channel and then providing filtered online threat data based on the user-customized keywords.

The present disclosure is also directed to providing a server and method for providing online threat data based on user-customized keywords, which are capable of collecting online threat data posted on a channel that a general user does not easily access and then building a database to provide threat information corresponding to user-customized keywords.

The present disclosure is also directed to providing a server and method for providing online threat data based on user-customized keywords, which are capable of specifying a channel where a user's desired message is present to search the channel.

The technical problems to be solved by the present disclosure are not limited to the above-described technical problems, and technical problems that are not mentioned will be clearly understood by those skilled in the art to which the present disclosure pertains from the present specification and the accompanying drawings.

According to an aspect of the present disclosure, there is provided a server for providing online threat data based on user-customized keywords, including: an online threat data collection unit that accesses a channel of a messenger program and collects channel-specific online threat data; an online threat database construction unit that analyzes the online threat data to extract a string, uses the string as an index to generate information for retrieving the online threat data, and stores the generated information in a channel-specific database; when the user-customized keywords and user identifiers are received from a user terminal through a user-customized keyword registration procedure, a user-customized keyword database construction unit that matches the user-customized keywords with the user identifiers and stores the matched user-customized keywords and user identifiers in a user-customized keyword database; and when the user terminal logs in using the user identifiers, an online threat data providing unit that extracts a pre-registered user-customized keyword corresponding to the user identifier from the user-customized keyword database, extracts the channel-specific online threat data corresponding to the user-customized keywords from the channel-specific database, and provides the extracted online threat data to the user terminal.

The server for providing online threat data based on user-customized keywords may further include a keyword recommendation model generation unit that generates a keyword recommendation model recommending keywords that match characters or strings currently input by a user while receiving the user-customized keywords through the user-customized keyword registration procedure.

According to another aspect of the present disclosure, there is provided a method of providing online threat data based on user-customized keywords, which is executed on a server based on the user-customized keywords, including: accessing a messenger program channel to collect channel-specific online threat data; analyzing the online threat data to extract a string, using the string as an index to generate information for retrieving the online threat data, and stores the generated information in a channel-specific database; when the user-customized keywords and user identifiers are received from a user terminal through a user-customized keyword registration procedure, matching the user-customized keywords with the user identifiers and stores the matched user-customized keywords and user identifiers in a user-customized keyword database; and when the user terminal logs in using the user identifiers, extracting a pre-registered user-customized keyword corresponding to the user identifier from the user-customized keyword database, extracting the channel-specific online threat data corresponding to the user-customized keywords from the channel-specific database, and providing the extracted online threat data to the user terminal.

The method may further include recommending keywords, which match characters or strings currently input by a user while receiving the user-customized keywords through the user-customized keyword registration procedure, using a pre-generated keyword recommendation model; and when the user determines the user-customized keywords among the recommended keywords, matching the determined user-customized keywords with the user identifiers and storing the matched user-customized keywords and user identifiers in the user-customized keyword database.

Technical solutions of the present disclosure are not limited to the above-described technical solutions, and technical solutions that are not mentioned will be clearly understood by those skilled in the art to which the present disclosure pertains from the present specification and the accompanying drawings.

BRIEF DESCRIPTION OF THE DRAWINGS

The above and other aspects of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
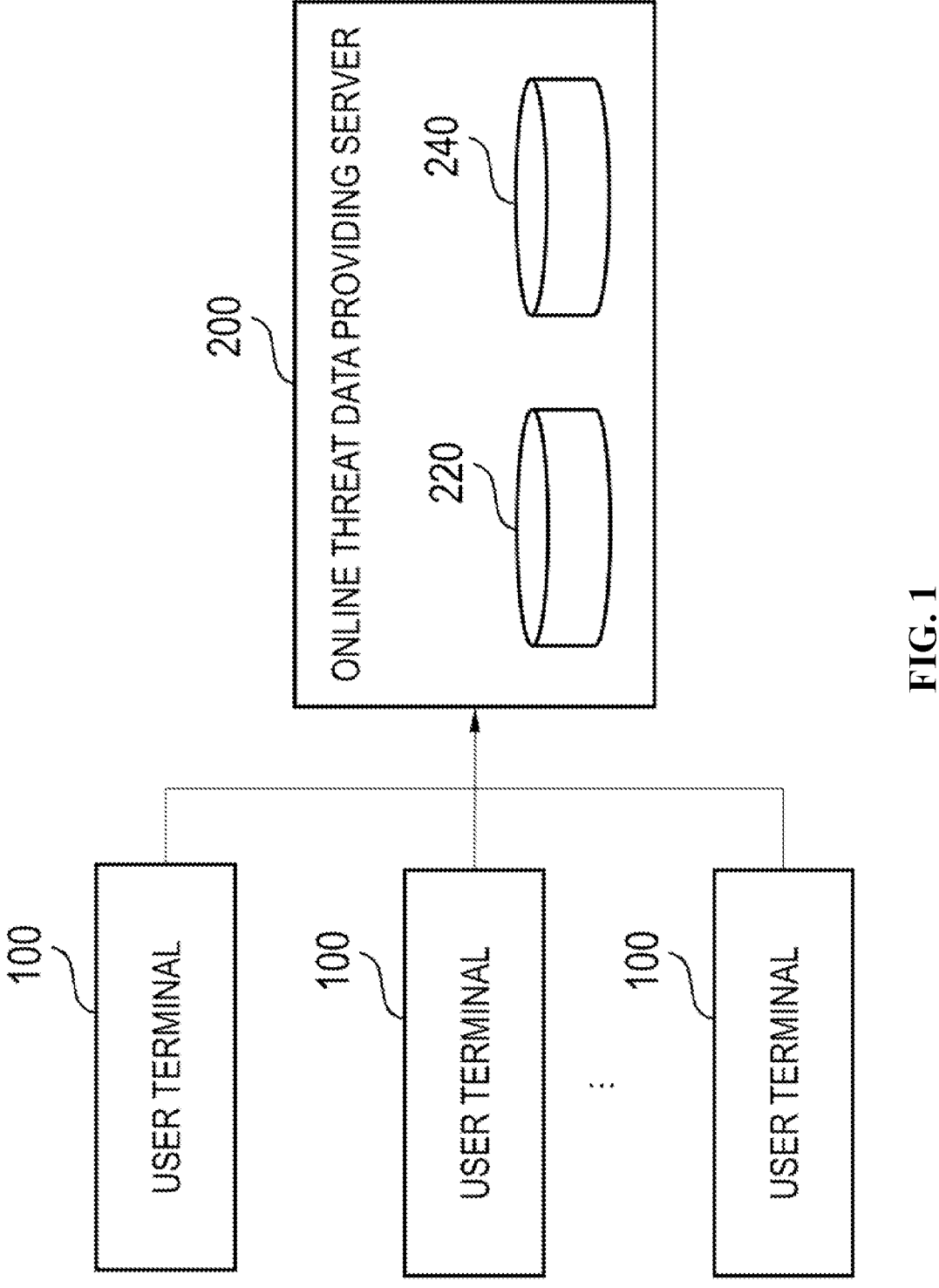
FIG. 1 is a network configuration diagram for describing a system for providing online threat data based on user-customized keywords according to an embodiment of the present disclosure.

Objects, features, and advantages of the present disclosure will become more obvious from the following detailed description provided in relation to the accompanying drawings. However, the present disclosure may be variously modified and have several embodiments. Hereinafter, specific embodiments of the present disclosure will be illustrated in the accompanying drawings and be described in detail.

In principle, same reference numerals denote same constituent elements throughout the specification. Further, elements having the same function within the scope of the same idea illustrated in the drawings of each embodiment will be described using the same reference numerals, and overlapping descriptions thereof will be omitted.

When it is determined that a detailed description for the known functions or configurations related to the present disclosure may obscure the gist of the present disclosure, detailed descriptions thereof will be omitted. In addition, numbers (for example, first, second, etc.) used in the description process of the present specification are only identification symbols for distinguishing one component from other components.

In addition, the terms "module" and "unit" for components used in the following embodiments are used only in order to easily make the disclosure. Therefore, these terms do not have meanings or roles that distinguish from each other in themselves.

In the following embodiments, singular forms include plural forms unless interpreted otherwise in context.

In the following embodiments, the term "include," "have," or the like means that a feature or element described in the specification is present, and it does not preclude in advance the possibility that one or more other features or components may be added.

Sizes of components may be exaggerated or reduced in the accompanying drawings for convenience of explanation. For example, the size and thickness of each component illustrated in the drawings are arbitrarily indicated for convenience of description, and the present disclosure is not necessarily limited to those illustrated.

In a case where certain embodiments can be otherwise implemented, the order of specific processes may be performed different from the order in which the processes are described. For example, two processes described in succession may be performed substantially simultaneously, or may be performed in an order opposite to the order described.

In the following embodiments, when components are connected, it includes not only a case where components are directly connected but also a case where components are indirectly connected via certain component interposed between the components.

For example, in the present specification, when components and the like are electrically connected, it includes not only a case where components are directly electrically connected, but also a case where components are indirectly electrically connected via certain component interposed between the components.

Hereinafter, a server and method for providing online threat data based on user-customized keywords according to exemplary embodiments of the present disclosure will be described with reference to FIGS. 1 to 5.

FIG. 1 is a network configuration diagram for describing a system for providing online threat data based on user-customized keywords according to an embodiment of the present disclosure.

Referring to FIG. 1, the system for providing online threat data based on user-customized keywords includes one or more user terminals 100 and a server 200 for providing online threat data based on user-customized keywords. Hereinafter, for convenience of description, the server 200 for providing online threat data based on user-customized keywords will be referred to as the server 200 for providing online threat data.

The user terminal 100 is a terminal owned by a user. The user terminal 100 receives online threat data corresponding to user-customized keywords from the server 200 for providing online threat data. This user terminal 100 may include mobile terminals including cell phones, smartphones, and tablet PCs, and computers including desktop computers and laptop computers.

The user terminal 100 may receive a membership subscription procedure from the server 200 for providing online threat data, and provide membership subscription information input from a user through the membership subscription procedure to the server 200 for providing online threat data. In this case, the membership subscription information may include a user identifier, a company name, an address, and/or a phone number.

Thereafter, the user terminal 100 logs in to the server 200 for providing online threat data using the user identifiers and then receives a user-customized keyword registration procedure from the server 200 for providing online threat data.

The user terminal 100 inputs the user-customized keywords through the user-customized keyword registration procedure and then provides the user-customized keywords and user identifiers to the server 200 for providing online threat data.

In this case, the user-customized keywords may include a plurality of keywords combined through conditional operators. The conditional operators may include an AND operator, an OR operator, and/or a NOT operator.

For example, when receiving the user-customized keywords "account OR stealer" through the user-customized keyword registration procedure, the user terminal 100 provides the received user-customized keywords to the server 200 for providing online threat data together with the user identifiers. Accordingly, the user terminal 100 may receive online threat data "I want to buy raccoon stealer pls dm me" and/or "I sell bulk SNS account" corresponding to the user-customized keyword "account OR stealer" from the server 200 for providing online threat data.

The server 200 for providing online threat data is a terminal that may execute a messenger program, and collects the online threat data through the messenger program. In this case, the messenger program may be Telegram.

Thereafter, the server 200 for providing online threat data may process channel-specific online threat data and then build a channel-specific database, and may extract and provide online threat data corresponding to the user-customized keywords received from the user terminal 100 through the channel-specific database.

Hereinafter, the process by which the server 200 for providing online threat data processes the channel-specific online threat data to build the channel-specific database will be described.

First, the server 200 for providing online threat data analyzes the online threat data for channel of a messenger program and extracts an online threat string.

For example, the server 200 for providing online threat data may extract some function strings of malicious Uniform Resource Locator (URL), malicious domains, and/or malicious Internet Protocol (IP) addresses included in the channel-specific online threat data of the messenger program.

Next, the server 200 for providing online threat data extracts tokens based on a space from the online threat string and determines whether the extracted tokens are stored as an index in the channel-specific database.

As an example, the server 200 for providing online threat data extracts tokens "I," "want," "to," "buy," "raccoon," "stealer," "pls," "dm," and "me" based on a space from "I want to buy raccoon stealer pls dm me" which is an online threat string of identifier "doc1," and determines whether "I," "want," "to," "buy," "raccoon," "stealer," "pls," "dm," and "me" are each stored as indexes in the channel-specific database.

As another example, the server 200 for providing online threat data extracts tokens "Anyone," "do," "Redline," "stealer," based on a space from "Anyone do Redline stealer please dm" which is an online threat string of identifier "doc2," and determines whether "Anyone," "do," "Redline," "stealer," "please," and "dm" are each stored as indexes in the channel-specific database.

Meanwhile, as a result of determining whether the tokens extracted from the online threat string are stored as the indexes in the channel-specific database, when the tokens extracted from the online threat string are stored as the indexes in the channel-specific database, the server 200 for providing online threat data stores an identifier of the corresponding online threat data in an identifier item of the online threat data corresponding to the index in the channel-specific database.

As an example, the server 200 for providing online threat data has extracted the tokens "I," "want," "to," "buy," "raccoon," "stealer," "pls," "dm," and "me" based on a space from "I want to buy raccoon stealer pls dm me" which is the online threat string of the identifier "doc1." Assume that, among the extracted tokens, the token "want" is stored as an index in the channel-specific database. In this case, the server 200 for providing online threat data stores the "doc1" in the identifier item of the online threat data corresponding to the index "want" in the channel-specific database.

As a result of determining whether the tokens extracted from the online threat string are stored as the indexes in the channel-specific database, when the tokens extracted from the online threat string are not stored as the indexes in the channel-specific database, the server 200 for providing online threat data stores the token as the index in the channel-specific database and then stores the identifier of the online threat data in the identifier item of the online threat data corresponding to the index.

As an example, the server 200 for providing online threat data has extracted the tokens "Anyone," "do," "Redline," "stealer," "please," and "dm" based on a space from "Anyone do Redline stealer please dm" which is the online threat string of the identifier "doc2." Assume that, among the extracted tokens, the token "The" is not stored as the index in the channel-specific database. In this case, the server 200 for providing online threat data stores "The" as the index in the channel-specific database and then stores the "doc2" in the identifier item of the online threat data corresponding to the index "The" in the channel-specific database.

Thereafter, the server 200 for providing online threat data assigns frequency tags to the indexes of the channel-specific database and then optimizes the channel-specific database based on the frequency tags. The channel-specific database may be optimized in various ways, which are described in more detail as follows.

According to one embodiment, the server 200 for providing online threat data measures the number of identifiers of the online threat data corresponding to each index in the database as the frequency.

Thereafter, the server 200 for providing online threat data assigns labels indicating frequencies to each index and then sorts the indexes according to the frequencies, thereby updating the database.

For example, the server 200 for providing online threat data assigns labels indicating frequencies to each index, such as (frequency 1000, "The"), (frequency: 34, "brown"), (frequency: 24, "dog"), and (frequency: 25, "laze"), and then sorting the indexes according to the frequency, thereby updating the channel-specific database.

According to another embodiment, the server 200 for providing online threat data analyzes the meaning of each index in the channel-specific database, groups indexes with different morphemes and puts the same meaning into one pair, and merges the identifiers of the online threat data for each grouped index.

For example, the indexes "the" and "The" have the same meaning in the channel-specific database. Therefore, the server 200 for providing online threat data groups the indexes "the" and "The" into "the and The", and merges identifiers "doc2 and doc3" of the online threat data corresponding to the index "the" and identifiers "doc1, doc2, and doc3" of the online threat data corresponding to the index "The" to generate the "doc1, doc2, and doc3."

Thereafter, when the user terminal 100 logs in to the server 200 for providing online threat data using the user identifiers, the server 200 for providing online threat data provides a user-customized keyword registration procedure to the user terminal 100.

When the user-customized keywords and the user identifiers input through the user-customized keyword registration procedure are received from the user terminal 100, the server 200 for providing online threat data matches the user-customized keywords with the user identifiers and stores the matched user-customized keywords and user identifiers in the user-customized keyword database.

In this case, the user-customized keywords may include a plurality of keywords combined through conditional operators. The conditional operators may include an AND operator, an OR operator, and/or a NOT operator.

Unlike the above-described example, the server 200 for providing online threat data recommends keywords based on characters or strings currently input by a user while receiving the user-customized keywords from the user. To this end, the server 200 for providing online threat data may generate a keyword recommendation model using the channel-specific online threat data.

The server 200 for providing online threat data deletes predetermined unused words or predetermined unused parts of speech from the online threat data. In this case, the unused words refer to words with morphemes that are not used in keywords, such as an adverb, a preposition, and/or a conjunction.

Then, the server 200 for providing online threat data extracts words based on a space from the online threat data and measures frequencies of words based on a pre-generated word-specific frequency database.

Thereafter, the server 200 for providing online threat data performs morpheme analysis on each word to generate the tokens in which the words and morpheme values are formed in pair and the labels indicating the frequencies are assigned.

For example, the server 200 for providing online threat data may generate the tokens such as (frequency: 1000, (word, morpheme value)), (frequency: 234, (word, morpheme value)), (frequency: 2541, (word, morpheme value)), . . . , and (frequency: 2516, (word, morpheme value)).

The server 200 for providing online threat data assigns different weights depending on the words and/or labels of each token.

That is, the server 200 for providing online threat data assigns different weights to each token depending on a type of languages (e.g., English, Chinese, Korean, etc.) implementing words in tokens, positions of words within the online threat data, and/or frequencies indicated by the labels assigned to the tokens.

Specifically, the server 200 for providing online threat data calculates a first weight for the current token based on a numerical value of the order of the current token based on the total number of tokens and an important value predetermined depending on the type of languages.

For example, the server 200 for providing online threat data may calculate "0.25" by assuming "12" as "1" and dividing 1 by 4 when the total number of tokens is 12 and the order of the current token is fourth. The first weight may be calculated by reflecting the important value predetermined depending on the type of languages in the value calculated in this way.

According to an embodiment, the important value may change depending on the order of the current token. Specifically, when an important word is a language that appears at an end of a sentence, the important value reflected may also increase as the order of the current token increases. When the important word is a language that appears at the beginning of the sentence, the important value reflected will decrease as the order of the current token increases.

Then, the server 200 for providing online threat data may calculate a second weight using a frequency indicated by a label of a current token, a frequency indicated by a label of a previous token, and a frequency indicated by a label of the next token.

Finally, the server 200 for providing online threat data calculates a final weight using the first weight and the second weight and assigns the final weight to the current token.

Thereafter, the server 200 for providing online threat data vectorizes the tokens and then learns the vectorized tokens to generate the keyword recommendation model. The generated keyword recommendation model may recommend keywords based on the characters or strings currently input by the user while receiving the user-customized keywords from the user.

In addition, the server 200 for providing online threat data extracts pre-registered user-customized keywords corresponding to user identifiers from the user-customized keyword database when a user terminal 100 logs in to the server 200 for providing online threat data using the user identifiers. Thereafter, the server 200 for providing online threat data may extract the channel-specific online threat data corresponding to the user-customized keywords from the channel-specific database and then provide the extracted channel-specific online threat data to the user terminal 100.

Figure 2:
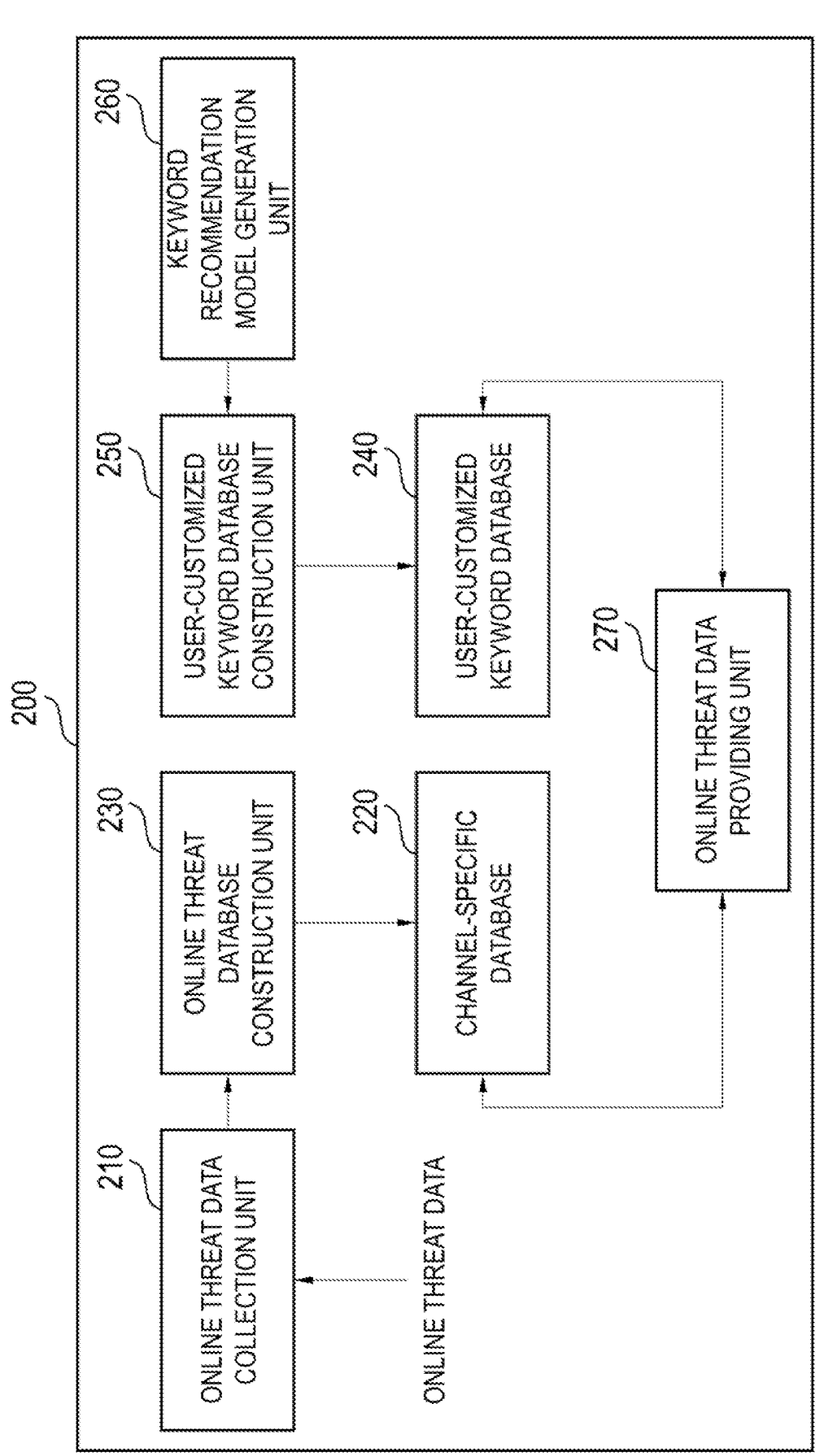
FIG. 2 is a block diagram for describing an internal structure of a server for providing online threat data based on user-customized keywords according to an embodiment of the present disclosure.

FIG. 2 is a block diagram for describing an internal structure of the server for providing online threat data according to the embodiment of the present disclosure.

Referring to FIG. 2, the server 200 for providing online threat data includes an online threat data collection unit 210, a channel-specific database 220, an online threat database construction unit 230, a user-customized keyword database 240, a user-customized keyword database construction unit 250, a keyword recommendation model generation unit 260, and an online threat data providing unit 270.

The online threat data collection unit 210 may collect the channel-specific online threat data of the messenger program. The collected channel-specific online threat data is processed and used to build the channel-specific database 220. In addition, the online threat data collection unit 210 may receive the user-customized keywords from the user terminal 100.

The online threat database construction unit 230 analyzes the channel-specific online threat data collected through the online threat data collection unit 210 to extract the online threat string.

For example, the server 200 for providing online threat data may extract some function strings of malicious Uniform Resource Locator (URL), malicious domains, and/or malicious Internet Protocol (IP) addresses included in the channel-specific online threat data of the messenger program.

Thereafter, the online threat database construction unit 230 extracts tokens based on a space from the online threat string and determines whether the extracted tokens are stored as indexes in the channel-specific database.

For example, the online threat database construction unit 230 extracts tokens "I," "want," "to," "buy," "raccoon," "stealer," "pls," "dm," and "me" based on a space from "I want to buy raccoon stealer pls dm me" which is the online threat string of the identifier "doc1." Then, it is determined whether "I," "want," "to," "buy," "raccoon," "stealer," "pls," "dm," and "me" are stored as the indexes in the channel-specific database 220.

As a result of the determination, when the tokens extracted from the online threat string are stored as the indexes in the channel-specific database 220, the online threat database construction unit 230 stores the identifier of the online threat data in the identifier item of the online threat data corresponding to the index in the channel-specific database 220.

For example, in the state where the tokens "I," "want," "to," "buy," "raccoon," "stealer," "pls," "dm," and "me" are extracted based on a space from "I want to buy raccoon stealer pls dm me" which is the online threat string of the identifier "doc1," when the token "want" among the extracted tokens is stored as an index in the channel-specific database 220, the online threat database construction unit 230 stores the identifier "doc1" in the identifier item of the online threat data corresponding to the index "want" in the channel-specific database 220.

As a result of the determination, when the tokens extracted from the online threat string are not stored as the indexes in the channel-specific database 220, the online threat database construction unit 230 stores the extracted token as the index in the channel-specific database 220 and then stores the identifier of the corresponding online threat data in the identifier item of the online threat data corresponding to the stored index.

For example, in the state where the tokens "Anyone," "do," "Redline," "stealer," "please," and "dm" are extracted based on a space from "Anyone do Redline stealer please dm" which is the online threat string of the identifier "doc2," when "The" among the extracted tokens is not stored as the index in the channel-specific database 220, the online threat database construction unit 230 stores the token "The" as the index in the channel-specific database 220 and then stores the identifier "doc2" in the identifier item of the online threat data corresponding to the index "The" in the channel-specific database 220.

Thereafter, the online threat database construction unit 230 assigns the frequency tags to the indexes of the channel-specific database and then optimizes the channel-specific database 220 based on the frequency tags. The channel-specific database 220 may be optimized in various ways, which are described in more detail as follows.

According to one embodiment, the online threat database construction unit 230 measures the number of identifiers of the online threat data corresponding to each index in the channel-specific database 220 as the frequency.

Thereafter, the online threat database construction unit 230 assigns the labels indicating the frequencies to each index and then sorts the indexes according to the frequencies, thereby updating the channel-specific database 220.

For example, the online threat database construction unit 230 assigns labels indicating frequencies to each index, such as (frequency 1000, "The"), (frequency: 34, "brown"), (frequency: 24, "dog"), and (frequency: 25, "lazy"), and then sorting the indexes according to the frequencies, thereby updating the channel-specific database 220.

According to another embodiment, the online threat database construction unit 230 analyzes the meaning of each index in the database 220, groups indexes with different morphemes but the same meaning into one pair, and merges the identifiers of the online threat data for each grouped index.

For example, the indexes "the" and "The" have the same meaning in the channel-specific database 220. Therefore, the online threat database construction unit 230 groups the indexes "the" and "The" into "the and The", and merges identifiers "doc2 and doc3" of the online threat data corresponding to the index "the" and the identifiers "doc1, doc2, and doc3" of the online threat data corresponding to the index "The" to generate the "doc1, doc2, and doc3."

The user-customized keyword database construction unit 250 provides the user-customized keyword registration procedure to the user terminal 100 that logs in to the server 200 for providing online threat data using the user identifiers.

When the user-customized keyword database construction unit 250 receives the user-customized keywords and the user identifiers input from the user terminal 100 through the user-customized keyword registration procedure, the user-customized keyword database construction unit 250 matches the user-customized keywords with the user identifiers and stores the matched user-customized keywords and user identifiers in the keyword database 240.

In this case, the user-customized keywords may include the plurality of keywords combined through the conditional operators. The conditional operators may include the AND operator, the OR operator, and/or the NOT operator.

The keyword recommendation model generation unit 260 may recommend keywords based on the characters or strings currently input by the user while receiving the user-customized keywords from the user. To this end, the keyword recommendation model generation unit 260 may generate the keyword recommendation model using the channel-specific online threat data.

The keyword recommendation model generation unit 260 deletes predetermined unused words or predetermined unused parts of speech from the online threat data. In this case, the unused words refer to words with morphemes that are not used in keywords, such as an adverb, a preposition, and/or a conjunction.

Then, the keyword recommendation model generation unit 260 extracts words based on a space from the online threat data and measures frequencies of words based on a pre-generated word-specific frequency database.

Thereafter, the keyword recommendation model generation unit 260 performs morpheme analysis on each word to generate the tokens in which the words and morpheme values are formed in pair and the labels indicating the frequencies are assigned.

For example, the keyword recommendation model generation unit 260 may generate the tokens such as (frequency: 1000, (word, morpheme value)), (frequency: 234, (word, morpheme value)), (frequency: 2541, (word, morpheme value)), . . . , and (frequency: 2516, (word, morpheme value)).

The keyword recommendation model generation unit 260 assigns different weights to the words and/or labels of each token.

That is, the keyword recommendation model generation unit 260 assigns different weights to each token depending on a type of languages (e.g., English, Chinese, Korean, etc.) implementing words in tokens, positions of words within the online threat data, and/or the frequency indicated by the labels assigned to the tokens.

Specifically, the keyword recommendation model generation unit 260 calculates a first weight for the current token based on a numerical value of the order of the current token based on the total number of tokens and an important value predetermined depending on the type of languages.

For example, the keyword recommendation model generation unit 260 may calculate "0.25" by assuming "12" as "1" and dividing 1 by 4 when the total number of tokens is 12 and the order of the current token is fourth. The first weight may be calculated by reflecting the important value predetermined depending on the type of languages in the value calculated in this way.

According to an embodiment, the important value may change depending on the order of the current token. Specifically, when an important word is a language that appears at an end of a sentence, the important value reflected may also increase as the order of the current token increases. When the important word is a language that appears at the beginning of the sentence, the important value reflected will decrease as the order of the current token increases.

Then, the keyword recommendation model generation unit 260 may calculate a second weight using a frequency indicated by a label of a current token, a frequency indicated by a label of a previous token, and a frequency indicated by a label of the next token.

Finally, the keyword recommendation model generation unit 260 calculates a final weight using the first weight and the second weight and assigns the final weight to the current token.

Thereafter, the keyword recommendation model generation unit 260 vectorizes the tokens and then learns the vectorized tokens to generate the keyword recommendation model. The generated keyword recommendation model may recommend keywords based on the characters or strings currently input by the user while receiving the user-customized keywords from the user.

When the user terminal 100 logs in to the server 200 for providing online threat data using the user identifiers, the online threat data providing unit 270 provides pre-registered user-customized information corresponding to the user identifiers from the user-customized keyword database 240.

Thereafter, the online threat data providing unit 270 extracts the channel-specific online threat data corresponding to the user-customized keyword from the channel-specific database 220 and then provides the extracted channel-specific online threat data to the user terminal 100.

Figure 3:
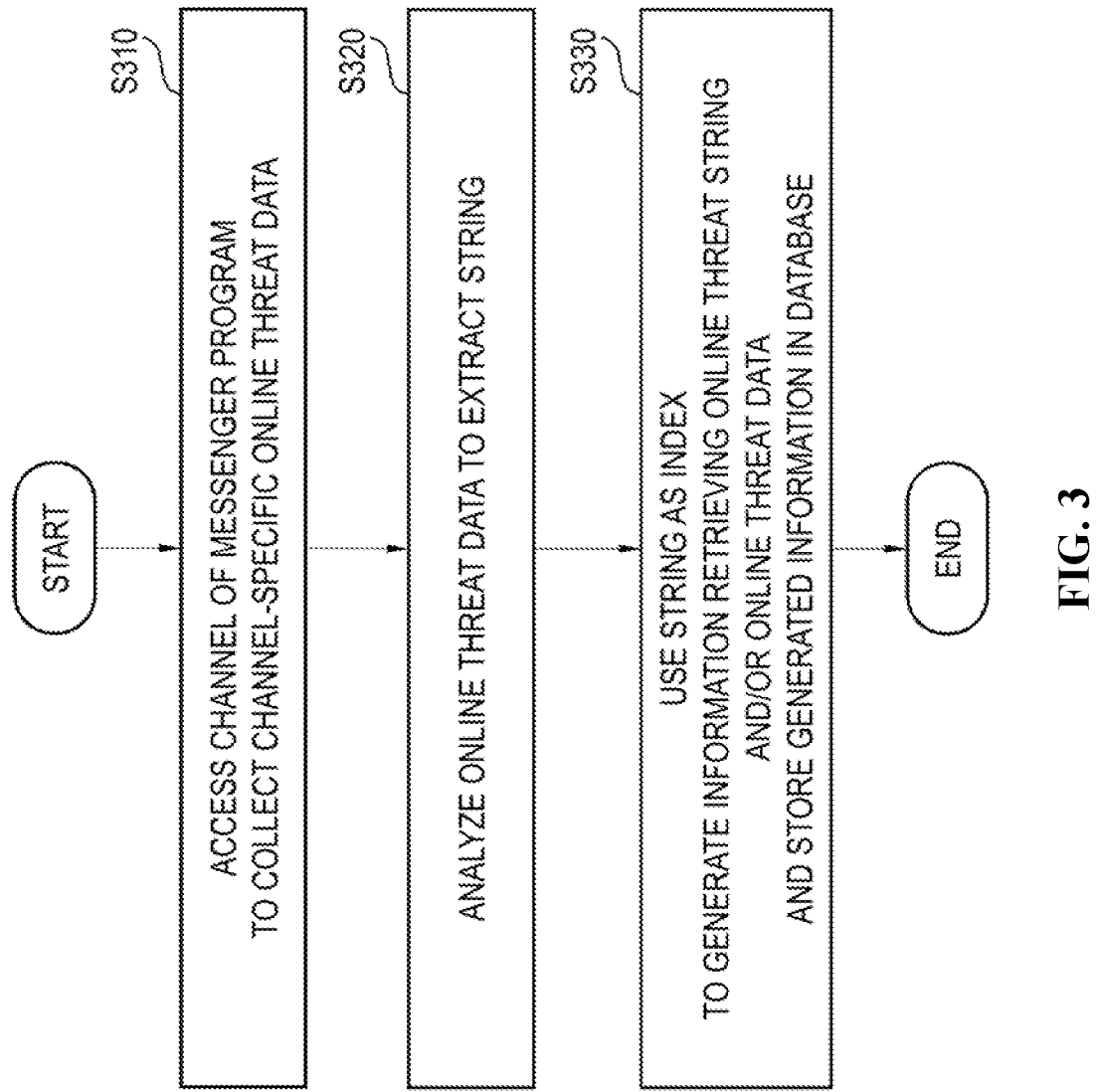
FIG. 3 is a flowchart for describing an aspect of a method of providing online threat data based on user-customized keywords according to the present disclosure.

FIG. 3 is a flowchart for describing an aspect of a method of providing online threat data based on user-customized keywords according to the present disclosure.

Referring to FIG. 3, the server 200 for providing online threat data accesses a channel of a messenger program to collect channel-specific online threat data (S310).

Thereafter, the server 200 for providing online threat data analyzes the collected online threat data to extracts a string (S320).

Next, the server 200 for providing online threat data generates information capable of retrieving online threat strings and/or online threat data using the extracted string as indexes and stores the generated information in the channel-specific database (S330).

Figure 4:
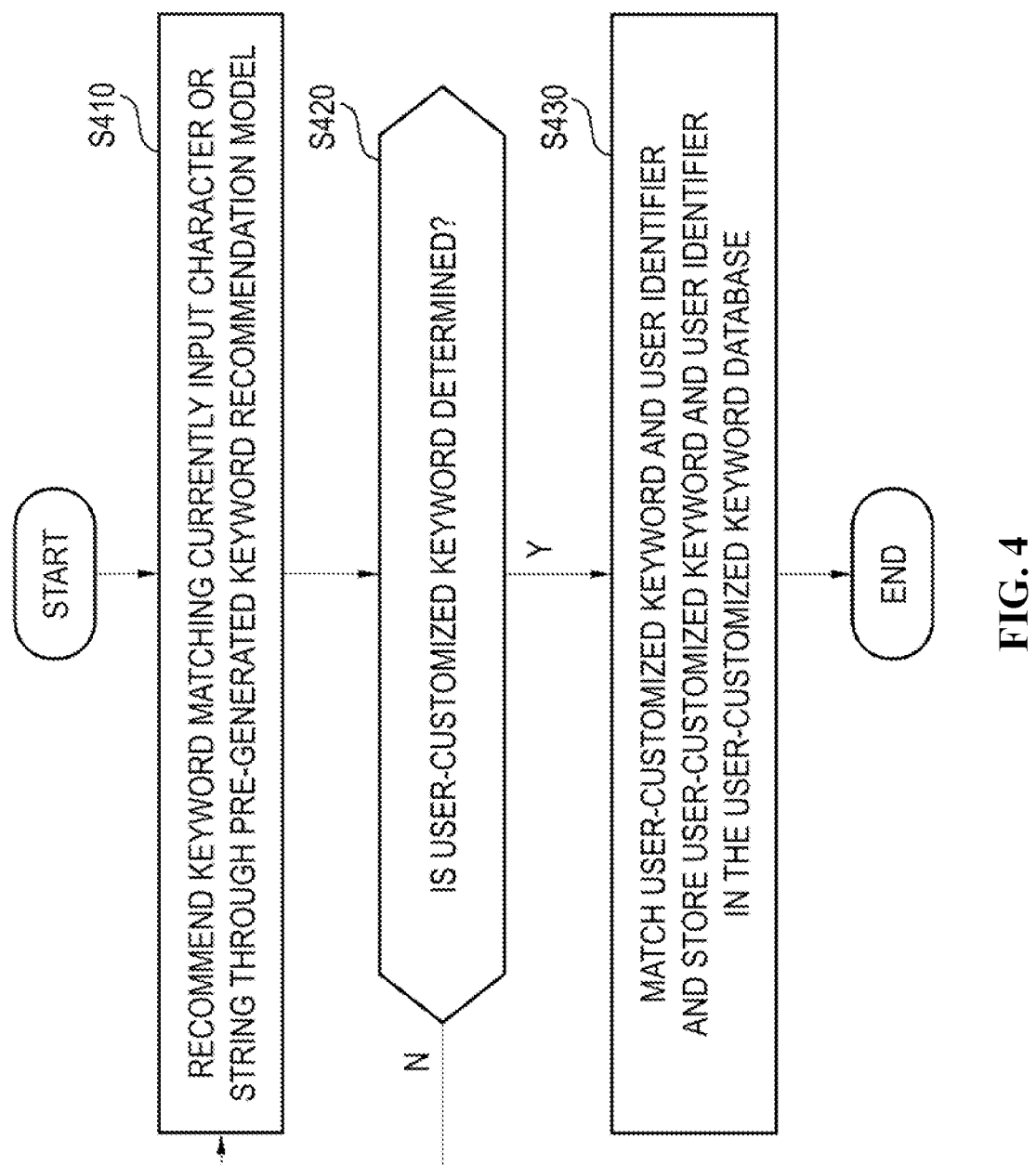
FIG. 4 is a flowchart for describing another aspect of the method of providing online threat data based on user-customized keywords according to the present disclosure.

FIG. 4 is a flowchart for describing another aspect of the method of providing online threat data based on user-customized keywords according to the present disclosure.

Referring to FIG. 4, the server 200 for providing online threat data recommends, through a pre-generated keyword recommendation model, keywords that match characters or strings currently input by a user while receiving user-customized keywords through a user-customized keyword registration procedure (S410).

The server 200 for providing online threat data determines whether the user-customized keyword has been determined by the user among the recommended keywords (S420).

As a result of the determination, when the user-customized keyword is determined (S420, Y), the server 200 for providing online threat data matches the determined user-customized keywords with user identifiers and stores the matched user-customized keywords and user identifiers in the user-customized keyword database 240 (S430).

As a result of the determination, when the user-customized keywords are not determined (S420, N), the server 200 for providing online threat data repeats operation S410.

Figure 5:
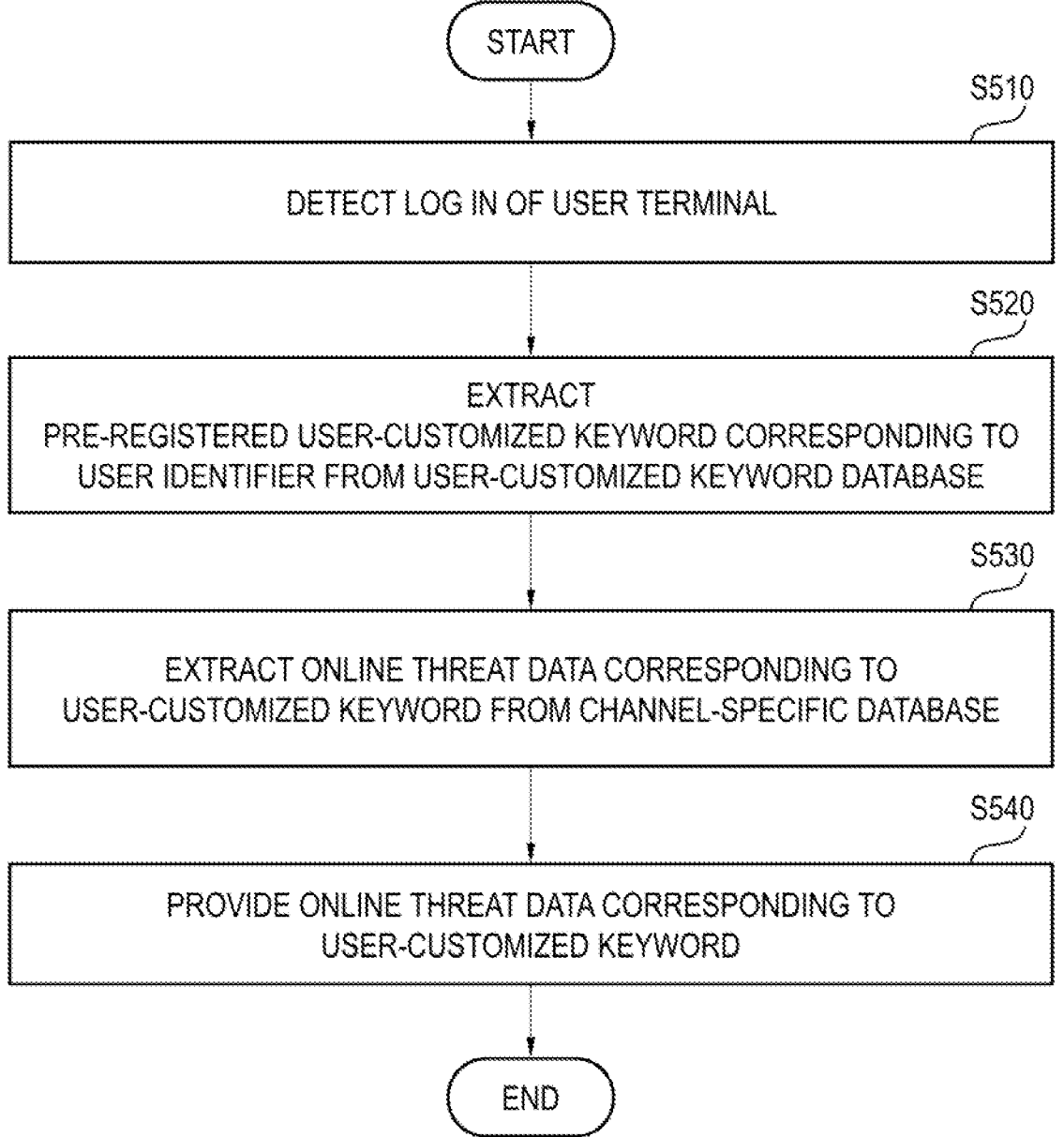
FIG. 5 is a flowchart for describing still another aspect of the method of providing online threat data based on user-customized keywords according to the present disclosure.

FIG. 5 is a flowchart for describing still another aspect of the method of providing online threat data based on user-customized keywords according to the present disclosure.

Referring to FIG. 5, the server 200 for providing online threat data detects login of the user terminal 100 (S510).

Next, the server 200 for providing online threat data extracts pre-registered user-customized keywords corresponding to user identifiers from the user-customized keyword database 240 (S520).

Thereafter, the server 200 for providing online threat data extracts the online threat data corresponding to the user-customized keywords from the channel-specific database 220 (S530).

Next, the server 200 for providing online threat data provides the online threat data corresponding to the user-customized keywords to the user terminal 100 (S540).

Hereinabove, the embodiments of the present disclosure have been described with reference to FIGS. 1 to 5. In the description with reference to FIG. 2, the case in which the server 200 for providing online threat data according to one embodiment of the present disclosure includes the online threat data collection unit 210, the channel-specific database 220, the online threat database construction unit 230, the user-customized keyword database 240, the user-customized keyword database construction unit 250, the keyword recommendation model generation unit 260, and the online threat data providing unit 270 is described as an example. Although not illustrated in the drawings, the server 200 for storing and managing online threat data may be configured to include a transceiver, a memory, and a processor.

The transceiver of the server 200 for providing online threat data may communicate with arbitrary external devices. Furthermore, the server 200 for providing online threat data may transmit and receive various types of data by connecting to the network through the transceiver. The transceiver may largely include a wired type and a wireless type. Since the wired type and the wireless type have their respective strengths and weaknesses, in some cases, the wired type and the wireless type may be simultaneously provided in the online threat data providing server 200. Here, in the case of the wireless type, a wireless local area network (WLAN)-based communication method such as Wi-Fi may be mainly used. Alternatively, in the case of the wireless type, cellular communication, for example, a long term evolution (LTE) and 5G-based communication method may be used. However, the wireless communication protocol is not limited to the above-described example, and any suitable wireless type communication method may be used. In the case of the wired type, local area network (LAN) or universal serial bus (USB) communication is a representative example, and other methods are also possible.

The memory of the online threat data providing server 200 may store various types of data temporarily or semi-permanently. An example of the memory may include a hard disk drive (HDD), a solid state drive (SSD), a flash memory, a read-only memory (ROM), a random access memory (RAM), or the like. The memory may be provided in a form built into the server 200 for providing online threat data or in a detachable form.

The memory may store various types of data necessary for the operation of the server 200 for providing online threat data, in addition to an operating program (OS) for running the server 200 for providing online threat data, and a program for operating each configuration of the server 200 for providing online threat data.

The processor of the server 200 for providing online threat data may control the overall operation of the server 200. Specifically, the processor may load and execute programs stored in the memory. The processor may be implemented as an application processor (AP), a central processing unit (CPU), a microcontroller unit (MCU), or similar devices thereto according to hardware, software, or a combination thereof. In this case, the processor may be provided in an electronic circuit form processing an electrical signal to perform a control function in terms of hardware, and may be provided in a program or code form driving the hardware circuit in terms of software.

Meanwhile, the disclosed embodiments may be implemented in the form of a recording medium that stores instructions executable by a computer. The instructions may be stored in the form of the program code, and when executed by the processor, may generate program modules to perform operations of the disclosed embodiments. The recording medium may be implemented as a computer-readable recording medium.

The computer-readable recording medium includes all types of recording media storing instructions that may be decoded by a computer. For example, there may be the ROM, the RAM, a magnetic tape, a magnetic disk, a flash memory, an optical data storage device, and the like.

In addition, the computer-readable storage medium may be provided in the form of a non-transitory storage medium. Here, the "non-transitory storage medium" means that the storage medium is a tangible device, and does not include a signal (for example, electromagnetic waves), and the term does not distinguish between the case where data is stored semi-permanently on a storage medium and the case where data is temporarily stored thereon. For example, the "non-transitory storage medium" may include a buffer in which data is temporarily stored.

According to an embodiment, the methods according to the diverse embodiments disclosed in this specification may be included and provided in a computer program product. The computer program product may be traded as a product between a seller and a purchaser. The computer program product may be distributed in the form of a machine-readable recording medium (for example, compact disc read only memory (CD-ROM)), or may be distributed (for example, download or upload) through an application store (for example, Play Store™) or may be directly distributed (for example, download or upload) between two user devices (for example, smartphones) online. In the case of the online distribution, at least some of the computer program products (for example, downloadable app) may be at least temporarily stored in a machine-readable recording medium such as a memory of a server of a manufacturer, a server of an application store, or a relay server or be temporarily created.

According to embodiments of the present disclosure, it is possible to collect online threat data posted on the public and private channels of Telegram and then provide online threat data filtered based on the user-customized keywords.

According to embodiments of the present disclosure, it is possible to collect online threat data posted on the channel that general users do not easily access and then build the database to provide the threat information corresponding to the user-customized keywords.

According to embodiments of the present disclosure, it is possible to specify the channel where the user's desired message is present to search the corresponding channel.

Technical effects of the present disclosure are not limited to the above-described technical effects, and technical effects that are not mentioned will be clearly understood by those skilled in the art to which the present disclosure pertains from the present specification and the accompanying drawings.

Features, structures, effects, etc., described in the above embodiments are included in at least one embodiment of the present disclosure, and are not necessarily limited only to one embodiment. Furthermore, features, structures, effects, etc., illustrated in each embodiment can be practiced by being combined or modified for other embodiments by those of ordinary skill in the art to which the embodiments pertain. Accordingly, the contents related to such combinations and modifications should be interpreted as being included in the scope of the present disclosure.

Although exemplary embodiments of the present disclosure have been mainly described hereinabove, these are only examples and do not limit the present disclosure. Those skilled in the art to which the present disclosure pertains may understand that several modifications and applications that are not described in the present specification may be made without departing from the spirit of the present disclosure. That is, each component specifically shown in the embodiments may be implemented by modification. In addition, differences associated with these modifications and applications are to be interpreted as being included in the scope of the present specification as defined by the following claims.

What is claimed is:

1. A server for providing online threat data based on user-customized keywords, the server comprising:

a processor; and a memory storing instructions executable by the processor, wherein the processor is configured to execute the instructions to:

access a channel of a messenger program and collect channel-specific online threat data, generate a keyword recommendation model for recommending keywords by using the channel-specific online threat data, wherein the keywords match characters or strings that are input by a user to a user terminal through a user-customized keyword registration procedure, analyze the channel-specific online threat data to extract an online threat string, use the online threat string as an index to generate information for retrieving the channel-specific online threat data, and store the generated information in a channel-specific database, when the characters or strings are input by the user to the user terminal through the user-customized keyword registration procedure, recommend the keywords that match the characters or strings by using the keyword recommendation model, and determine the user-customized keywords among the recommended keywords, when the user-customized keywords and a user identifier are received from the user terminal through the user-customized keyword registration procedure, match the user-customized keywords with the user identifier and store the matched user-customized keywords and user identifier in a user-customized keyword database, and when the user terminal logs in using the user identifier, extract a pre-registered user-customized keyword corresponding to the user identifier from the user-customized keyword database, extract the channel-specific online threat data corresponding to the user-customized keywords from the channel-specific database, and provide the extracted online threat data to the user terminal, and wherein the processor is further configured to execute the instructions to:

extract tokens from the online threat string based on spaces in the online threat string, determine whether the extracted tokens are stored as indexes in the channel-specific database, and based on a token among the extracted tokens being stored as an index in the channel-specific database, store an identifier of the online threat string in an identifier item corresponding to the index of the token in the channel-specific database.

2. The server of claim 1, wherein the processor is further configured to execute the instructions to:

when one token among the extracted tokens is not stored as an index in the channel-specific database, store, as an index in the channel-specific database, the one token in the channel-specific database and store the identifier of the online threat string in an identifier item corresponding to the index of the one token in the channel-specific database.

3. The server of claim 1, wherein the processor is further configured to execute the instructions to:

assign a label indicating a frequency to each index of the indexes in the channel-specific database and then sort the indexes according to the frequency to update the channel-specific database.

4. A method of providing online threat data based on user-customized keywords, which is executed on a server, the method comprising:

accessing a messenger program channel to collect channel-specific online threat data;

generating a keyword recommendation model for recommending keywords by using the channel-specific online threat data, wherein the keywords match characters or strings that are input by a user to a user terminal through a user-customized keyword registration procedure;

analyzing the online threat data to extract an online threat string, using the online threat string as an index to generate information for retrieving the channel-specific online threat data, and storing the generated information in a channel-specific database;

when the characters or strings are input by the user to the user terminal through the user-customized keyword registration procedure, recommending the keywords that match the characters or strings by using the keyword recommendation model, and determining the user-customized keywords among the recommended keywords;

when the user-customized keywords and a user identifier are received from the user terminal through the user-customized keyword registration procedure, matching the user-customized keywords with the user identifier and storing the matched user-customized keywords and user identifier in a user-customized keyword database; and when the user terminal logs in using the user identifier, extracting a pre-registered user-customized keyword corresponding to the user identifier from the user-customized keyword database, extracting the channel-specific online threat data corresponding to the user-customized keywords from the channel-specific database, and providing the extracted online threat data to the user terminal, wherein the method further comprises:

extracting tokens from the online threat string based on spaces in the online threat string, determining whether the extracted tokens are stored as indexes in the channel-specific database, and based on a token among the extracted tokens being stored as an index in the channel-specific database, storing an identifier of the online threat string in an identifier item corresponding to the index of the token in the channel-specific database.

5. The method of claim 4, further comprising:

when one token among the extracted tokens is not stored as an index in the channel-specific database, storing, as an index in the channel-specific database, the one token in the channel-specific database and storing the identifier of the online threat string in an identifier item corresponding to the index of the one token in the channel-specific database.

6. The method of claim 4, further comprising:

assigning a label indicating a frequency to each index of the indexes in the database and then sorting the indexes according to the frequency to update the channel-specific database.

* * * * *